US008142956B2

(12) United States Patent
Nagasawa et al.

(10) Patent No.: US 8,142,956 B2
(45) Date of Patent: Mar. 27, 2012

(54) FUEL CELL

(75) Inventors: Megumu Nagasawa, Osaka (JP); Masao Abe, Osaka (JP)

(73) Assignee: Nitto Denko Corporation, Osaka (JP)

( * ) Notice: Subject to any disclaimer, the term of this patent is extended or adjusted under 35 U.S.C. 154(b) by 935 days.

(21) Appl. No.: 10/542,618

(22) PCT Filed: Jan. 19, 2004

(86) PCT No.: PCT/JP2004/000385
§ 371 (c)(1),
(2), (4) Date: Jul. 18, 2005

(87) PCT Pub. No.: WO2004/066423
PCT Pub. Date: Aug. 5, 2004

(65) Prior Publication Data
US 2006/0057454 A1    Mar. 16, 2006

(30) Foreign Application Priority Data

Jan. 22, 2003  (JP) .................................. 2003-014090
Dec. 22, 2003  (JP) .................................. 2003-425591

(51) Int. Cl.
*H01M 4/86* (2006.01)
*H01M 8/10* (2006.01)
(52) U.S. Cl. ....................................... 429/530; 429/493
(58) Field of Classification Search .................... None
See application file for complete search history.

(56) References Cited

U.S. PATENT DOCUMENTS

| 5,116,541 A * | 5/1992 | Motogami et al. ...... 252/519.21 |
| 6,218,035 B1 * | 4/2001 | Fuglevand et al. .............. 429/30 |
| 6,300,015 B1 * | 10/2001 | Nishiyama et al. ........... 429/303 |
| 2002/0019308 A1 * | 2/2002 | Hitomi et al. ................. 502/159 |
| 2003/0113611 A1 * | 6/2003 | Abe et al. ......................... 429/43 |
| 2005/0084741 A1 * | 4/2005 | Leddy et al. .................... 429/44 |

FOREIGN PATENT DOCUMENTS

| JP | 59-209278 | * | 11/1984 |
| JP | 10-334922 A | | 12/1998 |
| JP | 2000-195489 | * | 7/2000 |
| JP | 2001-110428 A | | 4/2001 |
| JP | 2002-203570 A | | 7/2002 |
| JP | 2003-203641 A | | 7/2003 |
| JP | 2003-203642 A | | 7/2003 |
| JP | 2004-47244 A | | 2/2004 |
| JP | 2004-63137 A | | 2/2004 |
| JP | 2004-87272 A | | 3/2004 |
| WO | WO 01/43215 | * | 6/2001 |

OTHER PUBLICATIONS

Machine translation of JP 10-334922, Dec. 1998.*

* cited by examiner

*Primary Examiner* — Jonathan Crepeau
(74) *Attorney, Agent, or Firm* — Wenderoth, Lind & Ponack, L.L.P.

(57) ABSTRACT

The invention provides a fuel cell which comprises a cathode and an anode arranged to sandwich a proton-conductive ion exchange electrolytic membrane, oxygen and hydrogen containing carbon monoxide being supplied to the cathode and the anode, respectively, in which the cathode comprises an electroconductive porous substrate which carries thereon platinum or a platinum alloy and a proton-conductive ion exchange electrolytic polymer, and the anode comprises an electroconductive porous substrate which carries thereon platinum or a platinum alloy and a proton-conductive ion exchange electrolytic polymer, and further at least the anode carries a proton-supplying material thereon.

2 Claims, No Drawings

FUEL CELL

TECHNICAL FIELD

The present invention relates to a solid polymer fuel cell, specifically, a solid polymer fuel cell having an anode on which platinum or a platinum alloy is carried as an electrode catalyst, wherein reformed hydrogen containing carbon monoxide is used as a fuel supplied to this anode but the electrode catalyst is restrained from being poisoned with carbon monoxide, whereby a high power can be outputted.

BACKGROUND ART

In recent years, there have been developed fuel cells wherein: an anode on which platinum is carried and a cathode are arranged to sandwich a solid polymer electrolytic membrane, thereby forming an electrode/solid electrolyte/electrode structure; the electrode/solid electrolytic membrane/electrode structure is sandwiched between a pair of current collectors each having a channel formed in the inside face thereof; and a fuel and oxygen (or air) are supplied into the two channels, respectively, thereby generating electricity. There has also been made research on the matter that such fuel cells are laminated or two-dimensionally connected so as to improve the voltage or power thereof and the resultant is integrated into a system.

Such fuel cells are clean and have high efficiency, and further are not required to be electrically charged for a long period as performed in conventional secondary cells. From the viewpoint of a feature that substantially continuous use thereof can be attained when fuel is continuously supplied thereto, attention is paid to the use thereof for various purposes, in particular, power sources for electric automobiles, dispersed power sources for household, power sources for portable instruments, and others.

Meanwhile, as a fuel supplied to the anode, the following has been typically investigated: a gas fuel such as pure hydrogen, or hydrogen generated from a fuel such as alcohol or hydrocarbon by use of a reforming catalyst, which may be referred to as reformed hydrogen hereinafter; a mixed liquid fuel, such as water and methanol, dimethyl ether, ethylene glycol or polyhydric alcohol; or the like. However, problems remain. That is, fuel cells using liquid fuel give a low power and fuel cells using gas fuel output a low volume energy density from the viewpoint of storage and transportation thereof.

Thus, suggested is a method of mounting not only a fuel cell itself but also a reforming device onto a system, and generating electricity at the same time of generating reformed hydrogen from a liquid fuel. However, carbon monoxide is generated in the reforming-reaction and it remains in the reformed hydrogen so as to cause a problem that the carbon monoxide poisons the platinum catalyst to make the power of the fuel cell low. Against this, there is a method of adding a device for removing carbon monoxide to the reforming device. However, according to such a method, the whole of the system becomes large-sized; therefore, this matter becomes a problem against use for portable instruments or automobiles, in which a usable space is limited. Thus, in the present circumstances, the content of carbon monoxide cannot be decreased to a level such that the carbon monoxide has no effect of poisoning.

Thus, as another method, various platinum alloy catalysts, a typical example of which is an alloy of platinum and ruthenium, are suggested as electrode catalysts which are less poisoned than platinum. However, advantageous effects thereof have not yet been sufficiently obtained. Furthermore, it is suggested that carbon monoxide in fuel gas for fuel cells is selectively oxidized so as to decrease the concentration of carbon monoxide in the fuel gas (Japanese Patent Application National Publication No. 2003-519067). However, this is not a method for restraining the electrode catalyst from being poisoned with carbon monoxide.

The present invention has been made in order to solve the above-mentioned problems involved in the prior art solid polymer fuel cells each of which has an anode on which platinum or a platinum alloy is carried as an electrode catalyst wherein reformed hydrogen is supplied as fuel into the anode. Therefore, it is an object of the invention to provide a solid polymer fuel cell making it possible to restrain its electrode catalyst from being poisoned with carbon monoxide contained in reformed hydrogen thereby to output a high power.

DISCLOSURE OF THE INVENTION

The invention provides a fuel cell which comprises a cathode and an anode arranged to sandwich a proton-conductive ion exchange electrolytic membrane, oxygen and hydrogen containing carbon monoxide being supplied to the cathode and the anode, respectively, in which the cathode comprises an electroconductive porous substrate which carries thereon platinum or a platinum alloy and a proton-conductive ion exchange electrolytic polymer, and the anode comprises an electroconductive porous substrate which carries thereon platinum or a platinum alloy and a proton-conductive ion exchange electrolytic polymer, and further at least the anode carries a proton-supplying material thereon.

According to the invention, at least an anode carries a proton-supplying material so that in the case the anode has platinum or a platinum-ruthenium alloy as an electrode catalyst, the electrode catalyst of the anode is restrained from being poisoned even if hydrogen containing carbon monoxide is supplied to the anode as a fuel; consequently, a fuel cell having a high power can be obtained. In particular, by using, a proton acid crosslinked with a crosslinking agent as the proton-supplying material according to the invention, the carrying stability of the proton-supplying material on the electrode increases so that a drop in the power density can be suppressed into a low level even if the fuel cell is driven for a long time of 500 hours.

BEST MODES FOR CARRYING OUT THE INVENTION

The fuel cell of the invention comprises a cathode which comprises an electroconductive porous substrate which carries thereon platinum or a platinum alloy and a proton-conductive ion exchange electrolytic polymer and an anode which comprises an electroconductive porous substrate which carries thereon platinum or a platinum alloy and a proton-conductive ion exchange electrolytic polymer arranged to sandwich a proton-conductive ion exchange electrolytic membrane, and further a proton-supplying material is carried at least the anode out of the anode and the cathode.

As described above, the cathode and the anode each comprises an electroconductive porous substrate on which an electrode catalyst layer is formed. The electrode catalyst layer comprises, for example, carbon black powder on which fine particles of a noble metal, such as the above-mentioned platinum or platinum alloy, are carried, optionally carbon black powder as an electroconductive auxiliary, a binder for bonding these to each other, and a proton-conductive ion exchange electrolytic polymer which is a conductor of protons generated by electrochemical reaction. The proton-conductive ion exchange electrolytic polymer may be used as the binder.

According to the invention, in particular, the cathode comprises an electroconductive porous substrate which carries thereon platinum or a platinum alloy (for example, platinum-ruthenium alloy) and a proton-conductive ion exchange electrolytic polymer, and the anode comprises an electroconductive porous substrate which carries thereon platinum or a platinum alloy (for example, platinum-ruthenium alloy) and a proton-conductive ion exchange electrolytic polymer. Furthermore, at least the anode carries thereon a proton-supplying material.

Accordingly, the cathode is produced, for example, as follows. A paste is prepared from electroconductive carbon black powder on which fine particles of platinum or a platinum alloy are carried and carbon black as an optional electroconductive auxiliary by use of an appropriate binder (for example, a solution of polyvinylidene fluoride resin in N-methyl-2-pyrrolidone or a perfluorosulfonic acid resin solution such as Nafion® manufactured by Du Pont Co.), and the paste is applied onto an electroconductive porous substrate (for example, carbon paper manufactured by Toray Industries, Inc.); and heated and dried. When a polymer other than the proton-conductive resin is used as the binder, a solution of a proton-conductive ion exchange electrolytic polymer (for example, Nafion® manufactured by Du Pont Co.) is applied onto the resulting dried matter in order to give proton conductivity to the resulting catalyst layer. Then, the resulting matter is heated and dried to provide the cathode. However, the process for producing the cathode is not particularly limited in the invention.

Similarly, the anode is produced, for example, as follows. A paste is prepared from electroconductive carbon black powder on which fine particles of platinum or a platinum alloy are carried and carbon black as an optional electroconductive auxiliary by use of an appropriate binder as described above, and the paste is applied onto an electroconductive porous substrate as described above, and heated and dried. The resulting matter is impregnated with, for example, a solution of a proton-supplying material, heated and dried. If necessary, a solution of a proton-conductive ion exchange electrolytic polymer as described above is coated on the resulting matter, and heated and dried, to provide the anode. However, the process for producing the anode is not particularly limited as long as the anode has a proton-supplying material.

In the invention, the proton-supplying material is at least one selected from the group consisting of:

(a) a proton acid,
(b) a salt of a proton acid and a basic compound, and
(c) an electroconductive polymer composition doped with a proton acid.

Herein, the proton acid may be a mineral acid or an organic acid. In short, the acid may be any acid from which a proton can be dissociated and released. Examples of the mineral acid include sulfuric acid, hydrochloric acid, phosphoric acid, perchloric acid, bromic acid, nitric acid, boric acid, iodic acid, hydrofluoric acid, phosphohydrofluoric acid, and borohydrofluoric acid. However, the mineral acid is not limited thereto.

Meanwhile, it is preferred to use, as the organic acid, an organic acid having in the molecule an acidic group selected from a carboxyl group, a sulfonic acid group, a sulfuric acid group, a phosphoric acid group, and a phosphonic acid group. First, the organic acid having in the molecule a carboxyl group, that is, organic carboxylic acid, may be an aliphatic, aromatic, aromatic aliphatic or alicyclic organic carboxylic acid, and may be a monobasic acid or a polybasic acid. Furthermore, such an organic acid may have a substituent such as a hydroxyl group, a halogen, a nitro group, a cyano group, or an amino group.

Accordingly, specific examples of the organic acid include acetic acid, lactic acid, pentadecafluorooctanic acid, pentafluoroacteic acid, trifluoroacetic acid, trichloroacetic acid, dichloroacetic acid, monofluoroacetic acid, monobromoacetic acid, monochloroacetic acid, cyanoacetic acid, acetylacetic acid, nitroacetic acid, triphenylacetic acid, formic acid, oxalic acid, benzoic acid, m-bromobenzoic acid, p-chlorobenzoic acid, m-chlorobenzoic acid, o-nitrobenzoic acid, 2,4-dinitrobenzoic acid, 3,5-dinitrobenzoic acid, picric acid, o-chlorobenozoic acid, p-nitrobenzoic acid, m-nitrobenzoic acid, trimethylbenzoic acid, p-cyanobenzoic acid, m-cyanobenzoic acid, 5-aminosalicylic acid, o-methoxybenzoic acid, p-oxybenzoic acid, mandelic acid, phthalic acid, isophthalic acid, maleic acid, fumaric acid, malonic acid, tartaric acid, citric acid, lactic acid, succinic acid, α-alanine, β-alanine, glycine, glycolic acid, thioglycolic acid, ethylenediamine-N,N'-diacetic acid, and ethylenediamine-N,N,N',N'-tetraacetic acid.

Secondly, examples of the organic acid having in the molecule a sulfonic acid group, a sulfuric acid group, a phosphoric acid group, or a phosphonic acid group include aminonaphtolsulfonic acid, metanilic acid, sulfanyl acid, allylsulfonic acid, laurylsulfuric acid, xylenesulfonic acid, chlorobenzenesulfonic acid, 1-propanesulfonic acid, 1-butanesulfonic acid, 1-hexanesulfonic acid, 1-heptanesulfonic acid, 1-nonanesulfonic acid, 1-decanesulfonic acid, 1-dodecanesulfonic acid, benzenesulfonic acid, styrenesulfonic acid, p-toluenesulfonic acid, naphthalenesulfonic acid, monoalkyl phosphates such as methyl phosphate, ethyl phosphate, propyl phosphate and butyl phosphate, dialkyl phosphates such as dimethyl phosphate, diethyl phosphate, dipropyl phosphate and dibutyl phosphate, and monoalkyl phosphonates such as methyl phosphonate, ethyl phosphonate, propyl phosphonate and butyl phosphonate.

According to the invention, the organic acid is preferably a polymer having in the molecule an acidic group selected from carboxyl, sulfonic acid, sulfuric acid, phosphoric acid, and phosphonic acid groups. Of these, a polymeric acid having in the molecule a sulfonic acid group or a sulfuric acid group is preferably used. Such a polymeric acid may be a homopolymer made from a monomer having in the molecule an acidic group selected from a carboxyl group, a sulfonic acid group, a sulfuric acid group, a phosphoric acid group and a phosphonic acid group. In particular, a monomer having in the molecule a sulfonic acid group or a sulfuric acid group is preferred among the above.

According to the invention, the following can also be preferably used as the polymeric acid having in the molecule an acidic group: a sulfonated polymer obtained by producing a homopolymer made from an appropriate monomer or a copolymer made from it and a comonomer, and then subjecting this to a chemical treatment, for example, sulfonation.

Examples of such a homopolymer made from a monomer having in the molecule an acidic group or the above-mentioned sulfonated polymer include polyvinylsulfonic acid, polyvinylsulfuric acid, polystyrenesulfonic acid, sulfonated polystyrene/butadiene copolymer, polyallylsulfonic acid, polymethallylsulfonic acid, poly-2-acrylamide-2-methylpropanesulfonic acid, and polyacrylic halide.

A copolymer made from a monomer having in the molecule a sulfonic acid group or a sulfuric acid group and a monomer having in the molecule neither a sulfonic acid group or a sulfuric acid group can also be preferably used as the polymeric acid. The monomer having in the molecule thereof neither sulfonic acid group nor sulfuric acid group is desirably a monomer which does not undergo deteriorations, such as hydrolysis, in the presence of a strong acidic group such as a sulfonic acid group or a sulfuric acid group. Accordingly, examples of such a monomer include styrene, N-vinylpyrrolidone, acrylamide, acrylonitrile, acrylic acid, methacrylic acid, maleic acid, fumaric acid, vinylamine, 2-vinylpyridine, and 4-vinylpyridine.

Accordingly, examples of the polymeric acid made of such a copolymer include styrene/vinylsulfonic acid copolymer, styrene/vinylsulfuric acid copolymer, styrene/styrenesulfonic acid copolymer, styrene/2-acrylamide-2-methylpropanesulfonic acid copolymer, N-vinylpyrrolidone/vinylsulfonic acid copolymer, N vinylpyrrolidone/vinylsulfuricacid copolymer, N-vinylpyrrolidone/N-vinylpyrrolidone sulfonic acid copolymer, N-vinylpyrrolidone/2-acrylamide-2-methylpropanesulfonic acid copolymer, acrylic acid/vinylsulfonic acid copolymer, acrylic acid/vinylsulfuric acid copolymer, acrylic acid/styrenesulfonic acid copolymer, acrylic acid/2-acrylamide-2-methylpropanesulfonic acid copolymer, methacrylic acid/vinylsulfonic acid copolymer, methacrylic acid/vinylsulfuric acid copolymer, methacrylic acid/styrene sulfonic acid copolymer, methacrylic acid/2-acrylamide-2-methylpropanesulfonic acid copolymer, acrylamide/vinylsulfonic acid copolymer, acrylamide/vinylsulfuric acid copolymer, acrylamide/acrylamidesulfonic acid copolymer, acrylamide/2-acrylamide-2-methylpropanesulfonic acid copolymer, acrylonitrile/vinylsulfonic acid copolymer, acrylonitrile/vinylsulfuric acid copolymer, acrylonitrile/styrensulfonic acid copolymer, acrylonitrile/2-acrylamide-2-methylpropanesulfonic acid copolymer and N-vinylpyrrolidone/styrenesulfonic acid copolymer. Terpolymers similar to the above can also be preferably used.

A phenolsulfonic acid novolak resin obtained by addition condensation reaction of phenol with phenolsulfonic acid is also one example of the polymeric acid which can be preferably used in the invention. Of course, at the time of producing such a phenolsulfonic acid novolak resin, phenol or phenolsulfonic acid may have various substituents.

At the time of producing, in particular, the polymeric acid made of such a copolymer having in the molecule thereof an acidic group, the ratio of the acidic group, such as a sulfonic acid group or a sulfuric acid group, in the resultant polymeric acid, can be adjusted at will by adjusting the ratio between the monomer having the acidic group and the monomer having no acidic group, which are to be copolymerized. Consequently, the ion exchange capacity of the polymeric acid can easily be adjusted, as will be described below.

The ion exchange capacity is such an amount that the equivalent of the ion exchangeable acidic groups which a polymeric acid has is converted into a value per gram of the dry weight of the resin and then the resultant value is represented in unit of milliequivalent. Such an ion exchange capacity of a polymeric acid can be measured as follows: first, the dry weight of the polymeric acid is precisely weighed; next, the polymeric acid is added to a given amount of an aqueous alkali solution the concentration of which is beforehand specified; while the solution is stirred if necessary, the polymeric acid is caused to react with an alkali over a given time; the polymeric acid is removed from the aqueous alkali solution; the alkali remaining in the aqueous alkali solution is subsequently subjected to back titration to obtain the remaining amount thereof; and from the result, the ion exchange capacity per gram of the dry weight of the polymeric acid can be calculated. The unit of the ion exchange capacity is "meq/g (milliequivalent(s)/g)", wherein "eq" represents the equivalent(s) in acid-base reaction and "m" is a prefix representing 1/1000 (milli).

As described above, in the case of copolymerizing a monomer having in the molecule thereof an acidic group, such as a sulfonic acid group, with a monomer not having in the molecule thereof such an acidic group to yield a polymeric acid, the ion exchange capacity of the resultant polymeric acid can be designed at will. For example, in the case of copolymerizing styrene with vinylsulfonic acid to yield a polymeric acid made of styrene/vinylsulfonic acid copolymer, the ion exchange capacity based on the vinylsulfonic acid component in the resultant polymeric acid can be obtained by, for example, the following manner.

A styrene/vinylsulfonic acid copolymer represented by the following formula (I) will be considered:

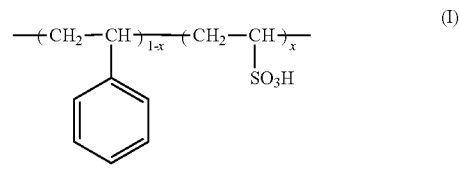

wherein x represents the molar fraction of vinylsulfonic acid. Since the molecular weight of styrene is 104 and the molecular weight of vinylsulfonic acid is 108, the formula weight of recurring units of the above-mentioned copolymer is:

$$104(1-x)+108x=104+4x$$

The number of sulfonic acid groups in the recurring units is x. Thus, the formula weight of each of the sulfonate groups is:

$$(104+4x)/x$$

Accordingly, the mole number of 1 g of this copolymer is:

$$1/(104+4x)/x=x/(104+4x)$$

Hence, the ion exchange capacity, which is the value of the milliequivalent(s) per gram of the dry resin, is represented by the following:

$$1000x/(104+4x)$$

Consequently, when the molar fraction of vinylsulfonic acid is changed from 0 to 1, the ion exchange capacity of the styrene/vinylsulfonic acid copolymer can be changed from 0 to 9.26 meq/g. For reference, when the molar fractions of vinylsulfonic acid are 0.10, 0.20 and 0.50, the ion exchange capacities of the copolymer can be calculated into 0.96 meq/g, 1.91 meq/g and 4.72 meq/g, respectively. However, when a monomer other than styrene is used as the comonomer with vinylsulfonic acid, the ion exchange capacity of the resultant copolymer is different from the value of the above-mentioned styrene/vinylsulfonic acid copolymer even if the molar fractions of vinylsulfonic acid are equal to each other.

According to the invention, in particular, when a polymeric acid is used as the proton-supplying material, the electrode catalyst can be sufficiently restrained from being poisoned with carbon monoxide by using a polymer acid having an ion exchange capacity of 1.6 meq/g or more. As the value of the ion exchange capacity of the used polymeric acid is larger, the electrode catalyst can be more satisfactorily restrained from being poisoned with carbon monoxide. The ion exchange capacity of perfluorosulfonic acid (Nafion®, manufactured by Du Pont Co.) is 1.0 meq/g or less.

Further according to the invention, the polymeric acid carried on the anode may be crosslinked with a crosslinking agent. To crosslink the polymeric acid with a crosslinking agent, it is necessary for the polymeric acid to have a functional group which is to be crosslinked with the crosslinking agent. Specific examples of the crosslinking agent include polyfunctional isocyanates, polyfunctional acid anhydrides, polyfunctional epoxides, and polyfunctional carbodiimides. However, the crosslinking agent used in the invention is not limited thereto. In the invention, the polyfunctional isocyanates may be blocked polyisocyanates, wherein isocyanate groups are blocked with a blocking agent such as a phenolic compound or oxime compound. Such a blocked polyisocyanate can be preferably used as a crosslinking agent, particularly, in a solvent having active hydrogen, such as an aqueous solvent or an alcohol. At the time of heating and drying such a blocked polyisocyanate, the blocking agent therein departs from the isocyanate groups to regenerate isocyanate groups, and the isocyanate groups react with the proton-supplying material which has active hydrogen to form a crosslinked structure thereby to make the proton-supplying material insoluble in the solvent.

The use of such a crosslinking agent makes it possible to crosslink the polymeric acid having in the molecule a functional group having active hydrogen, such as an amino, hydroxyl or carboxyl group. In the case that the polymeric acid has in the molecule a double bond, the polymeric acid can be crosslinked by use of a radical initiator or a sulfur compound. In the case of using, as the polymeric acid, for example, a phenolsulfonic acid novolak resin, the phenolic hydroxyl groups which the phenolsulfonic acid novolak resin has are caused to react with a polyfunctional isocyanate to crosslink the resin, whereby the phenolsulfonic acid novolak resin can be converted to a water-insoluble resin. It is however desired that the polyfunctional polyisocyanate is used in the form of a blocked polyisocyanate.

In general, many polymeric acids are water-soluble; therefore, in the case of using any one of such polymeric acids as a proton-supplying material, it is very useful that the polymeric acid is crosslinked with a crosslinking agent to be made water-insoluble in order to carry the polymeric acid stably on the fuel cell electrode(s) without causing the polymeric acid to flow out from the electrode(s).

According to the invention, the proton-supplying material may be a salt of a proton acid as described above and a basic compound. However, such a basic compound that has a negative charge such as a hydroxyl ion or an alkoxyl ion is not preferred since the compound is neutralized with the proton acid so that protons vanish. According to the invention, the basic compound is preferably a compound which has not any electric charge but has a free electron pair to exhibit basicity. Accordingly, such a basic compound is preferably an organic amine or a nitrogen-containing heterocyclic compound. Specifically, examples thereof include aliphatic or alicyclic amine compounds such as triethylamine, ethylenediamine and piperidine; aromatic amines such as aniline, diphenylamine, phenylenediamine and toluidine; and nitrogen-containing aromatic heterocyclic compounds such as pyridine and imidazole.

The basic compound which is combined with the proton acid to form a salt may be a polymer. Such a polymer is preferably a polymer having in the molecule thereof a basic group such as an amino group, that is, a polymeric base. Accordingly, the main polymer chain of such a polymeric base may be a polyolefin, a polyamide, a polyimide, a polyether, a condensed heterocyclic polymer or the like, and is not particularly limited.

Specific examples of the polymeric base in the present invention include polyvinylamine, polyallylamine, polyvinylpyridine, polyvinylimidazole, polybenzimidazole, and polyquinoline. Besides, a polymeric base wherein an aromatic ring has a basic group such as an amino group can easily be obtained by nitrating a polymer having in the molecule thereof an aromatic ring, at the aromatic ring, with a nitrating agent such as mixed acid (nitrating acid) in accordance with an ordinary method, and then reducing the nitro group to an amino group by various methods that have been conventionally known.

The proton-supplying material may be selected from electroconductive polymers doped with a proton acid. An example of a polymer capable of releasing a proton acid, out of such electroconductive polymers, is a material obtained by converting a p-type electroconductive polymer to an oxidized form and doping the oxidized form polymer with a proton acid. Specific examples of such an electroconductive polymer include polyaniline, polyalkylaniline, poly(o-phenylenediamine), polypyrrole, and polyindole.

For example, p-type doping of polyaniline can be performed by the doping of oxidized-form polyaniline with a proton acid or the oxidization doping of reduced-form polyaniline. In the doping of oxidized-form polyaniline with a proton acid, the imine nitrogen atoms in the quinonediimine structure moieties of oxidized-form polyaniline (a) are first protonated with the proton acid, as shown in the following sheme. This polyaniline (b) having quaternary quinonediimine structures is equal, in the canonical structural formula thereof, to polyaniline (c) having semi-quinone structures each having a cationic radical. In these polyanilines (b) and (c), electric charges are close to each other in each molecule thereof. Thus, the anilines are each unstable; therefore, intermolecular redox reaction is caused in such a manner that the electric charges spread, on average, in the whole of the molecular chain thereof. Consequently, the electric charges are rearranged so that any two out of the nitrogen atoms having the charges are positioned to sandwich a nitrogen atom of a different kind. In this way, a p-type electroconductive polymer, that is, doped polyaniline (d) is yielded.

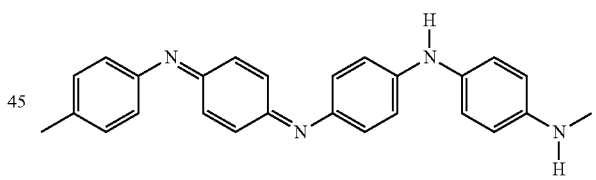

(a)

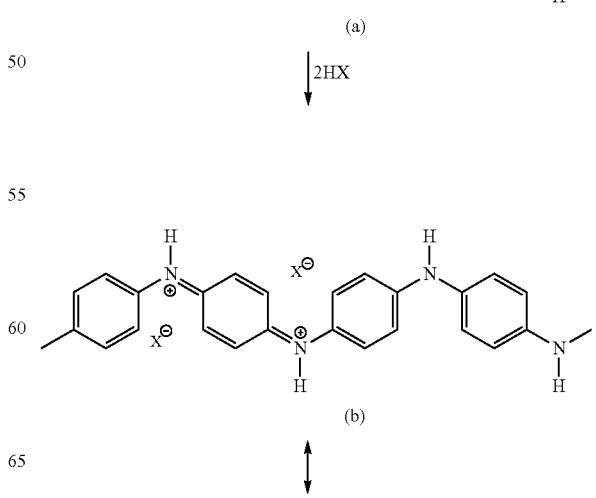

(b)

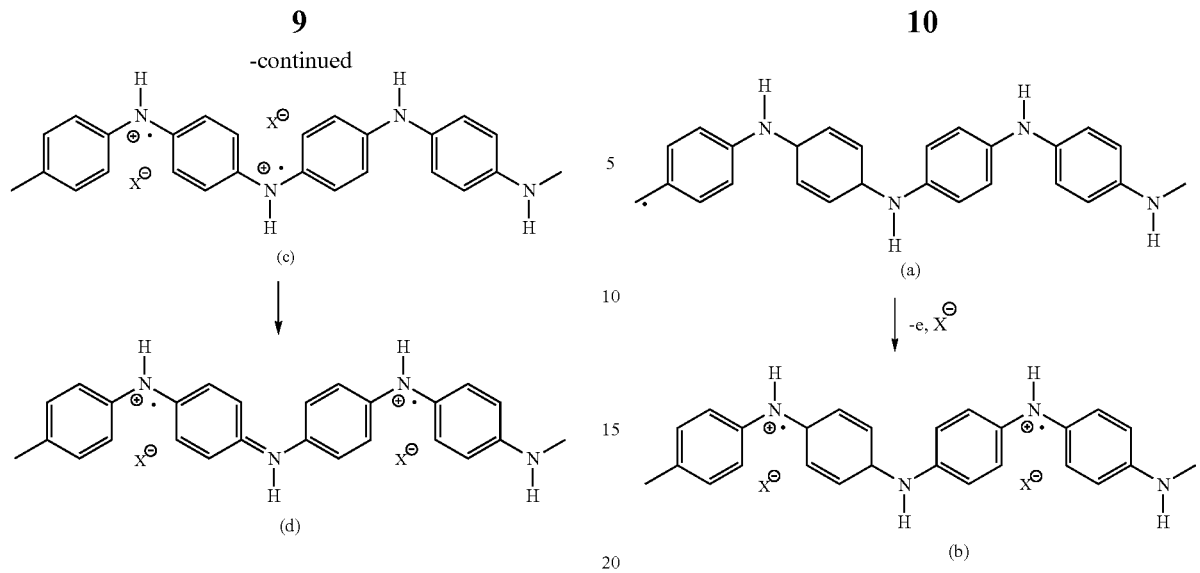

As shown in the following scheme, the oxidization doping of reduced-form polyaniline is equal to abstracting one electron from the unshared electron pair of an amine nitrogen atom in the reduced-form polyaniline (a). In the case of chemical doping, the electron is abstracted with a chemical oxidizer. In the case of electrochemical doping, the electron is forcibly abstracted from the positive electrode. As described herein, in the case of abstracting one electron from the unshared electron pair of an amine nitrogen atom in reduced-form polyaniline, the nitrogen atom has a cationic radical structure. This cationic radical bonds to an anion present in the system so that the radical keeps electrically neutral. The polyaniline (b) in a cationic radical state which is obtained by the oxidization doping of reduced-form polyaniline in such a way has a structure equal to that of polyaniline in a semi-quinone radical state which is finally obtained by the above-mentioned proton-acid-doping of oxidized-form polyaniline. Thus, in both of the cases, a p-type electroconductive polymer is produced.

Meanwhile, an n-type electroconductive polymer is reduced electrolytically in the presence of a proton acid and the resulting electroconductive polymer doped with a proton acid can be used as a proton-supplying material. Specific examples of such an n-type electroconductive polymer include polyphenylquinoxaline. For example, the n-type doping of polyphenylquinoxaline means that polyphenylquinoxaline (a) is converted to a salt (b) or (c) thereof under acidic conditions and subsequently this salt is electrolytically reduced, thereby injecting electrons into polyphenylquinoxaline, as shown in the following scheme. Polyphenylquinoxaline (d), which is n-type-doped in this way, makes it possible to supply protons into the system by reverse reaction of the above-mentioned doping.

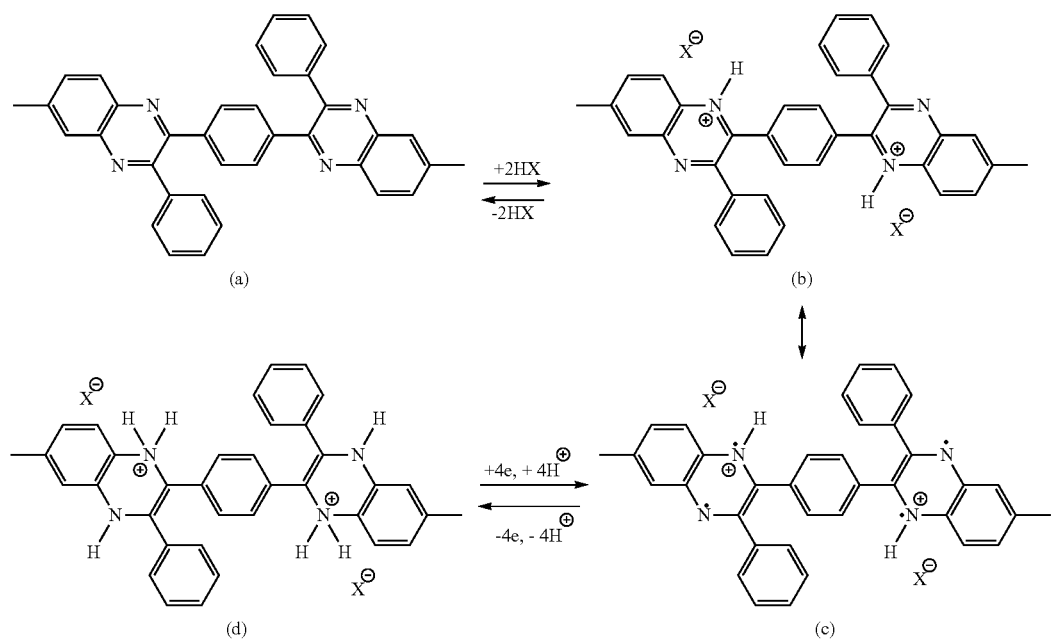

According to the invention, it is particularly preferred that the proton-supplying material contains a polymer in order to restrain the proton-supplying material from being lost from the electrode(s) even if the fuel cell is used over a long term. For example, it is desired to use a polymeric acid or an electroconductive polymer composition as the proton acid, or it is desired to use a salt of a proton acid and a polymeric base as the proton-supplying material.

According to the invention, such a proton-supplying material is carried on at least the anode. The amount of the proton-supplying material carried on the anode is usually from 10 to 10000 parts by weight for 100 parts by weight of the amount of platinum or the platinum alloy carried on carbon paper. If the amount of the proton-supplying material carried on the anode is less than 10 parts by weight for 100 parts by weight of the amount of platinum or the platinum alloy carried on the carbon paper, the effect of restraining the anode from being poisoned with carbon monoxide is insufficient. On the other hand, if the amount is more than 10000 parts by weight, there are unfavorably generated inconveniences such as corrosion of metal regions of the system for the fuel cell, such as pipes or cells thereof.

In the fuel cell of the present invention, a cation exchange membrane made of a perfluorosulfonic acid resin, for example, Nafion®, as used in conventional solid polymer membrane type cells, is preferably used as a proton conductive ion exchange electrolytic membrane. However, the membrane which can be used is not limited thereto. Thus, for example, the following are allowable: a porous membrane made of a fluorine-contained resin, such as polytetrafluoroethylene, impregnated with the above-mentioned Nafion® or some other ion conductive material; or the above-mentioned Nafion® or some other ion conductive material carried on a porous membrane or nonwoven fabric made of a polyolefin resin such as polyethylene and polypropylene. In the invention, however, the proton conductive ion exchange electrolytic membrane is not regarded as a member included in the category of the proton-supplying material.

In the fuel cell according to the invention, gaseous oxygen is supplied into the cathode, and gaseous hydrogen containing carbon monoxide is supplied into the anode. The oxygen may be air. As the hydrogen containing carbon monoxide, for example, reformed hydrogen, which is generated from a fuel such as an alcohol or hydrocarbon by use of a reforming catalyst, is preferably used. In particular, in the fuel cell according to the invention, it is possible to restrain the anode from being sufficiently poisoned with the electrode catalyst to output a high power over a long term even if reformed hydrogen containing 10 to 5000 ppm of carbon monoxide is used as the fuel therefor.

The process for producing reformed hydrogen is already well-known. For example, for the purpose of reforming methanol, a reforming catalyst is used to subject methanol to steam reforming and further carbon monoxide reforming, whereby hydrogen and carbon dioxide can be obtained. The reformed hydrogen based on such reforming of methanol still contains a large amount of carbon monoxide; therefore, carbon monoxide is catalytically oxidized selectively into carbon dioxide, thereby to reduce the amount of carbon monoxide in the reformed hydrogen is decreased into several hundreds of parts per million. However, the origin of the hydrogen containing carbon monoxide used as the fuel in the invention is not particularly limited.

The operating temperature of the fuel cell of the invention is usually 0° C. or higher, preferably from 15 to 120° C., and in particular preferably from 30 to 100° C. If the operating temperature is too high, deterioration and exfoliation of the used materials, or others may be caused.

Industrial Applicability

The solid polymer fuel cell of the invention has an anode on which platinum or a platinum alloy is carried as an electrode catalyst, and reformed hydrogen containing carbon monoxide is supplied as the fuel into the anode, but the solid polymer fuel cell of the invention has a high power output since the electrode catalyst is restrained from being poisoned with carbon monoxide. According to a preferred embodiment, it is possible to restrain a fall in the power density of the fuel cell into a low level even if it is driven for a long period.

EXAMPLES

The present invention will be described by way of the following examples. However, the invention is not limited by these examples.

Example 1

In a mortar, 180 mg of electroconductive carbon black powder (EC-20-PTC, manufactured by ElectroChem, Inc., USA) on which platinum was carried in an amount of 20% by weight, 36 mg of electroconductive carbon black, 24 mg of polyvinylidene fluoride, and 940 mg of N-methyl-2-pyrrolidone were mixed to prepare a paste. A portion of this paste was applied onto one surface of a carbon paper 2.3 cm square (TGP-H-90, manufactured by Toray Industries, Inc., and having a film thickness of 260 µm), and heated at 80° C. for 60 minutes so as to be dried. In the thus prepared platinum-carried carbon paper, the amount of the carried solid contents was 20 mg. The amount of the carried platinum in the solid contents was 3 mg. Then, a 5% by weight alcohol solution (manufactured by Aldrich Co.) of a proton conductive ion exchange electrolytic polymer, Nafion® was applied onto the platinum-carried surface of this platinum-carried carbon paper, and heated at 80° C. for 30 minutes so as to be dried, thereby yielding a cathode having on the carbon paper an electrode catalyst layer.

The same platinum-carried carbon paper as deacribed above was prepared. Then, a solution of undoped polyphenylquinoxaline in m-cresol was dropped onto the platinum-carried surface of the platinum-carried carbon paper, and heated at 80° C. for 120 minutes so as to be dried. In the thus prepared platinum-carried carbon paper, the amount of the carried polyphenylquinoxaline was 1 mg. In this way, polyphenylquinoxaline was carried on the platinum-carried surface of the platinum-carried carbon paper, and further a 5% by weight alcohol solution (manufactured by Aldrich Co.) of the Nafion® was applied onto the surface, and heated to 80° C. for 30 minutes so as to be dried. The thus obtained electrode was fixed onto a platinum wire, and then electrolytically reduced at −0.2 V (vs. SCE) in a 6M solution of sulfuric acid in water for 30 minutes to dope the polyphenylquinoxaline into an n-type. Sulfuric acid was carried onto this polyphenylquinoxaline, and then heated 80° C. in the atmosphere of nitrogen for 60 minutes so as to be dried, thereby yielding an anode having, on the carbon paper thereof, an electrode catalyst layer.

An acid-type Nafion® membrane (Nafion® 112, manufactured by Du Pont Co.) was put as a proton conductive ion exchange electrolytic membrane between the thus obtained cathode and anode, and then the resultant was heated and pressed using a hot press in the atmosphere of nitrogen at a temperature of 135° C., thereby providing an electrode-proton exchange membrane jointed body. This was used to fabricate a mono-layered fuel cell for tests.

This fuel cell was integrated into a fuel cell evaluating device (manufactured by Toyo Corp., the same hereinafter), and the temperature of the cell was set to 70° C. At a humidifier temperature of 70° C., oxygen gas was supplied into the cathode at a rate of 500 mL/minute and simultaneously at a humidifier temperature of 70° C., a hydrogen/carbon dioxide mixed gas (containing 200 ppm of carbon monooxide, ratio by mole of hydrogen/carbon dioxide: 75/25) was supplied into the anode at a rate of 500 mL/minute. The pressure for supplying the gases was set to normal pressure. The power density of this cell was 33 mW/cm$^2$ at a voltage of 0.4 V.

Example 2

In a mortar, 120 mg of electroconductive carbon black powder (EC/20/10-PT/RU, manufactured by ElectroChem, Inc., USA) on which a platinum-ruthenium alloy (ratio by weight of platinum/ruthenium: 2/1) was carried in an amount of 30% by weight, 96 mg of electroconductive carbon black, 24 mg of polyvinylidene fluoride, and 940 mg of N-methyl-2-pyrrolidone were pulverized and mixed to prepare a paste. A portion of this paste was applied onto one surface of a carbon paper 2.3 cm square, which was the same as in Example 1, and heated at 80° C. for 60 minutes so as to be dried. In the thus prepared platinum-ruthenium alloy carried carbon paper, the amount of the carried solid contents was 20 mg. The amount of the carried platinum-ruthenium alloy in the solid contents was 3 mg. Then, a 5% by weight alcohol solution (manufactured by Aldrich Co.) of a proton conductive ion exchange electrolytic polymer, Nafion® was applied onto this platinum-ruthenium alloy carried surface of the platinum-ruthenium alloy carried carbon paper, and heated at 80° C. for 30 minutes so as to be dried. Thereafter, the resultant was immersed into a 4 M solution of sulfuric acid in water at room temperature for 30 minutes, and then heated at 80° C. for 60 minutes, so as to be dried, thereby yielding an anode having, on the carbon paper thereof, an electrode catalyst layer.

An acid-type Nafion® membrane (Nafion® 112, manufactured by Du Pont Co.) was put between the thus obtained anode and a cathode obtained in the same way as in Example 1, and then heated and pressed using a hot press at a temperature of 135° C., thereby providing an electrode-proton exchange membrane jointed body. This was used to fabricate a mono-layered fuel cell for tests.

This fuel cell was integrated into a fuel cell evaluating device, and the temperature of the cell was set to 40° C. At a humidifier temperature of 40° C., oxygen gas was supplied into the cathode at a rate of 500 mL/minute and simultaneously at a humidifier temperature of 40° C., a hydrogen/carbon dioxide mixed gas (containing 200 ppm of carbon monooxide, ratio by mole of hydrogen/carbon dioxide: 75/25) was supplied into the anode at a rate of 500 mL/minute. The pressure for supplying the gases was set to normal pressure. The power density of this cell was 36 mW/cm$^2$ at a voltage of 0.4 V.

Comparative Example 1

A mono-layered fuel cell for tests was fabricated in the same way as in Example 1 except that at the time of producing the anode, no polyphenylquinoxaline was carried thereon and the electrolytic reduction for n-type doping in the 6 M solution of sulfuric acid in water was not performed. The power density of this cell was 9 mW/cm$^2$ at a voltage of 0.4 V.

Comparative Example 2

A mono-layered fuel cell for tests was fabricated in the same way as in Example 1, using an anode yielded in the same way as in Example 2 except that at the time of producing the anode, no sulfuric acid was carried on the anode. The power density of this cell was 12 mW/cm$^2$ at a voltage of 0.4 V.

Example 3

An anode having, on a carbon paper thereof, an electrode catalyst layer was yielded in the same way as in Example 2 except that a HiSPEC 10000 manufactured by Johnson Matthey Fuel Cells Japan Ltd. was used as the platinum-ruthenium alloy catalyst instead of the EC/20/10-PT/RU manufactured by ElectroChem, Inc., USA and the 4M sulfuric acid treatment was not conducted.

This anode was immersed into a 2 N solution of polyvinylsulfonic acid in water in a laboratory dish, and then vacuum-impregnated, as it was, at room temperature in a vacuum drier. The vacuum degree was raised up to a degree such that air bubbles were generated from the whole of the anode surface. The anode was kept in this state for 1 minute. Thereafter, the vacuum degree of the vacuum drier was lowered so as to return the pressure into the atmospheric pressure. The system was left as it was for 12 hours, and then the anode was taken out. The polyvinylsulfonic acid adhering on the surface was removed by putting the anode between portions of a paper towel. Thereafter, the anode was dried at 80° C. in a hot-wind circulating drier for 30 minutes. The ion exchange capacity of the polyvinylsulfonic acid was 9.3 meq/g.

The anode obtained as described above and a cathode obtained in the same way as in Example 1 were used, and an acid-type Nafion® membrane (Nafion® 112, manufactured by Du Pont Co.) was put between the anode and the cathode as a proton-conductive ion exchange electrolytic membrane in the same way as in Example 1. The resultant was heated and pressed using a hot press at a temperature of 135° C., thereby providing an electrode-proton exchange membrane jointed body. This was used to fabricate a mono-layered fuel cell for tests.

This fuel cell was integrated into a fuel cell evaluating device, and the temperature of the cell was set to 25° C. At a humidifier temperature of 35° C., oxygen gas was supplied into the cathode at a rate of 500 mL/minute and simultaneously at a humidifier temperature of 35° C., a hydrogen/carbon dioxide mixed gas (containing 200 ppm of carbon monooxide, ratio by mole of hydrogen/carbon dioxide: 75/25) was supplied into the anode at a rate of 500 mL/minute. The pressure for supplying the gases was set to normal pressure. The power density of this cell was 120 mW/cm$^2$ at a voltage of 0.4 V, and was 67 mW/cm$^2$ at a voltage of 0.65 V.

Example 4

An anode having, on a carbon paper thereof, an electrode catalyst layer was yielded in the very same way as in Example 3 except that a styrene/vinylsulfonic acid copolymer was used instead of polyvinylsulfonic acid. The styrene/vinylsulfonic acid copolymer was a copolymer obtained by emulsion polymerization of styrene and vinylsulfonic acid. The molar fraction of vinylsulfonic acid therein was 0.75, and the ion exchange capacity was 7.0 meq/g.

The anode obtained as described above and a cathode obtained in the same way as in Example 1 were used, and an acid-type Nafion® membrane (Nafion® 112, manufactured by Du Pont Co.) was put between the anode and the cathode as a proton-conductive ion exchange electrolytic membrane in the same way as in Example 1. The resultant was heated and pressed using a hot press at a temperature of 135° C., thereby providing an electrode-proton exchange membrane jointed body. This was used to fabricate a mono-layered fuel cell for tests.

This fuel cell was integrated into a fuel cell evaluating device, and the temperature of the cell was set to 25° C. At a humidifier temperature of 35° C., oxygen gas was supplied into the cathode at a rate of 500 mL/minute and simultaneously at a humidifier temperature of 35° C., a hydrogen/carbon dioxide mixed gas (containing 200 ppm of carbon monooxide, ratio by mole of hydrogen/carbon dioxide: 75/25) was supplied into the anode at a rate of 500 mL/minute. The pressure for supplying the gases was set to normal pressure. The power density of this cell was 100 mW/cm$^2$ at a voltage of 0.4 V, and was 61 mW/cm$^2$ at a voltage of 0.65 V.

Comparative Example 3

An electrode-proton exchange membrane jointed body was yielded in the entirely same way as in Example 3 except that the anode having, on the carbon paper thereof, the electrode catalyst layer was not vacuum-impregnated with the 2 N solution of polyvinylsulfonic acid in water. This was used to fabricate a mono-layered fuel cell for tests.

This fuel cell was integrated into a fuel cell evaluating device, and the temperature of the cell was set to 25° C. At a humidifier temperature of 35° C., oxygen gas was supplied into the cathode at a rate of 500 mL/minute and simultaneously at a humidifier temperature of 35° C., a hydrogen/carbon dioxide mixed gas (containing 200 ppm of carbon monooxide, ratio by mole of hydrogen/carbon dioxide: 75/25) was supplied into the anode at a rate of 500 mL/minute. The pressure for supplying the gases was set to normal pressure. The power density of this cell was 30 mW/cm$^2$ at a voltage of 0.4 V, and was 30 mW/cm$^2$ at a voltage of 0.65 V.

Example 5

In a mortar, 120 mg of electroconductive carbon black powder (EC/20/10-PT-RU, manufactured by ElectroChem, Inc., USA) on which a platinum-ruthenium alloy (ratio by weight of platinum/ruthenium: 2/1) was carried in an amount of 30% by weight, 96 mg of electroconductive carbon black, 261 mg of a solution of a p-phenolsulfonic acid novolak resin in water (manufactured by Konishi Chemical Ind. Co., Ltd., and having a solid content concentration of 45.9% and an average molecular weight of 22000), 850 mg of a blocked polyisocyanate AQB-102 (manufactured by Nippon Polyurethane Industry Co., Ltd.), 3440 mg of N-methyl-2-pyrrolidone were pulverized and mixed to prepare a paste. A portion of this paste was applied onto one surface of a carbon paper 2.3 cm square, which was the same as in Example 1, and heated at 150° C. for 60 minutes, so that the paste was dried and further the blocking agent of the blocked polyisocyanate was released to reproduce isocyanate groups. In this way, the groups were subjected to crosslinking reaction with the phenolic hydroxyl groups in the p-phenolsulfonic acid novolak resin.

In the thus prepared platinum-ruthenium alloy carried carbon paper, the amount of the carried solid contents was 95 mg. The amount of the carried platinum-ruthenium alloy in the solid contents was 5.8 mg. Then, a 5% by weight alcohol solution (manufactured by Aldrich Co.) of a proton conductive ion exchange electrolytic polymer, Nafion® was applied onto the platinum-ruthenium alloy carried surface of this platinum-ruthenium alloy carried carbon paper, and heated at 80° C. for 30 minutes so as to be dried. In this way, an anode having, on the carbon paper thereof, an electrode catalyst layer was yielded.

An acid-type Nafion® membrane (Nafion® 112, manufactured by Du Pont Co.) was put between this anode and a cathode obtained in the same way as in Example 1, and then the resultant was heated and pressed using a hot press at a temperature of 135° C., thereby providing an electrode-proton exchange membrane jointed body. This was used to fabricate a mono-layered fuel cell for tests.

This fuel cell was integrated into a fuel cell evaluating device, and the temperature of the cell was set to 20° C. At a humidifier temperature of 20° C., oxygen gas was supplied into the cathode at a rate of 500 mL/minute and simultaneously at a humidifier temperature of 20° C., a hydrogen/carbon dioxide mixed gas (containing 200 ppm of carbon monooxide, ratio by mole of hydrogen/carbon dioxide: 75/25) was supplied into the anode at a rate of 500 mL/minute. The pressure for supplying the gases was set to normal pressure. The power density of this cell was 60 mW/cm$^2$ at a voltage of 0.4 V. This fuel cell was continuously driven at 25° C. As a result, the power density thereof was 50 mW/cm$^2$ at 0.4 V even after 500 hours. Thus, the fuel cell was excellent in endurance in continuous driving.

The p-phenolsulfonic acid novolak resin is water-soluble, but it was confirmed as follows that the resin reacts with polyisocyanate and is crosslinked: blocked polyisocyanate was added and dissolved into a solution of the p-phenolsulfonic acid novolak resin in water, and this was cast into a glass plate; and subsequently the resultant was heated at 150° C. for 30 minutes. As a result, the p-phenolsulfonic acid novolak resin was crosslinked to form a water-insoluble film.

The invention claimed is:

1. A fuel cell which comprises a cathode and an anode sandwiching a proton-conductive ion exchange electrolytic membrane, and permitting oxygen and hydrogen containing carbon monoxide to be supplied to the cathode and the anode, respectively, in which the cathode comprises an electroconductive porous substrate which carries thereon platinum and a proton-conductive ion exchange electrolytic polymer, and the anode comprises an electroconductive porous substrate which carries thereon platinum or a platinum alloy and a proton-conductive ion exchange electrolytic polymer, and further at least the anode carries a proton-supplying material thereon, wherein the proton-supplying material consists essentially of at least one of polymeric acids selected from:
polyvinylsulfuric acid,
polyallylsulfonic acid,
polymethallylsufonic acid, and
poly-2-acrylamide-2-methylpropanesulfonic acid.

2. The fuel cell according to claim 1, wherein the proton-conductive ion exchange electrolytic polymer is perfluorosulfonic acid resin.

* * * * *